Figure 1:
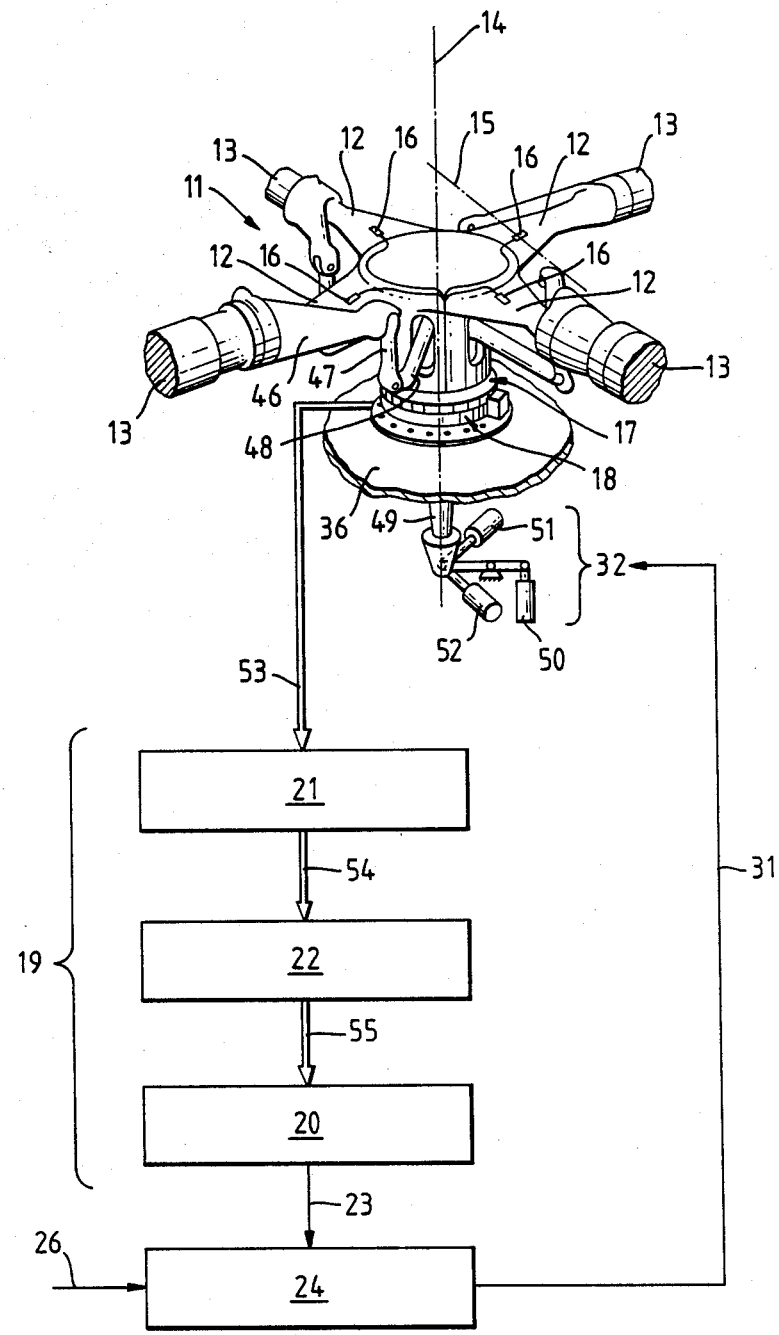

United States Patent [19]

Taylor et al.

[11] Patent Number: 4,834,318
[45] Date of Patent: May 30, 1989

[54] HELICOPTER FLIGHT CONTROL SYSTEMS

[75] Inventors: Paul Taylor, Bruton; Jane M. Thorpe, Somerton; Alistair C. Graham, Yeovil, all of England

[73] Assignee: Westland Group plc, Yeovil, England

[21] Appl. No.: 130,946

[22] Filed: Dec. 10, 1987

[30] Foreign Application Priority Data

Dec. 15, 1986 [GB] United Kingdom ............... 8629896

[51] Int. Cl.$^4$ ............................................. B64C 27/57
[52] U.S. Cl. ................................................. 244/17.13
[58] Field of Search ..................... 244/17.13; 364/434; 416/30, 101

[56] References Cited

U.S. PATENT DOCUMENTS

| | | | |
|---|---|---|---|
| 3,938,762 | 2/1976 | Murphy | 244/17.13 |
| 3,954,229 | 5/1976 | Wilson | 244/17.13 |
| 4,025,230 | 5/1977 | Rastan | 244/17.13 |
| 4,519,743 | 5/1985 | Ham | 244/17.13 |

Primary Examiner—Joseph F. Peters, Jr.
Assistant Examiner—Rodney Corl
Attorney, Agent, or Firm—Larson and Taylor

[57] ABSTRACT

In a helicopter, signals representative of the rotor disc attitude of a main sustaining rotor (11) are fed into a flight control system (24) to modify an actuator demand signal (31) controlling a rotor blade actuation system (32) of the main sustaining rotor.

9 Claims, 4 Drawing Sheets

HELICOPTER FLIGHT CONTROL SYSTEMS

This invention relates to helicopter flight control systems.

The helicopter, particularly the single sustaining rotor/single tail rotor configuration, is inherently unstable and cross coupled in its behaviour.

The inherent instability is due to the aerodynamic characteristics of the sustaining rotor. The lateral and longitudinal motions are coupled through the thrust vector but the cross coupling mainly arises as a result of the phase changes between the control input and the rotor disc tilt due to gyroscopic precession, and the phase change associated with the heavily damped rotor disc tilt response. Cross coupling increases as the first flap frequency of the rotor blade flapping modes increases.

Modern helicopters incorporate a stability augmentation system (SAS) to provide improved stability and control characteristics often as part of an automatic flight control system (AFCS). The SAS feeds back signals representative primarily of helicopter fuselage rates such as pitch rate, roll rate etc, which signals are superimposed on pilot input signals to modify control inputs to the sustaining rotor actuation system.

The effect of the aforementioned first flap frequency on such an SAS that is primarily closed around body rates is to limit the usable values of system gain in the rate loop resulting in slow control characteristics, and it is therefore an object of the present invention to improve the control characteristics of the helicopter and to reduce the cross coupling between longitudinal and lateral axes.

Accordingly, in one aspect, this invention provides a helicopter having a fuselage, a main sustaining rotor with a plurality of rotor blades, an actuation system including a plurality of actuators for controlling the pitch of the rotor blades and a flight control system for providing actuator demand signals and signal generating means for generating signals representative of the rotor disc attitude of the main sustaining rotor, the generated signals being fed into the flight control system for modifying the actuator demand signal.

By rotor disc attitude we mean the attitude of a generally circular plane described by the tips of the rotor blades during rotation about an axis of rotation. The rotor disc can be tilted due to control inputs and within physical limits in any direction relative the aircraft axes.

The signal generating means may comprise means for providing signals proportional to the flap positions of each of the rotor blades and processing means for providing the 1R, or one-per-revolution, components of the blade flap positions. The processing means may include an anti-aliasing filter, a converter for converting said signals to digital form and a signal processor for providing the 1R components.

Conveniently, each rotor blade may donate a proportion of one revolution of flap information to create a complete rotor revolution of blade flap information.

Preferably the flight control system provides actuator demand signals for control in the longitudinal axis and actuator demand signals for control in the lateral axis, said signal generating means including means for generating a signal representative of longitudinal rotor disc attitude for modifying said longitudinal actuator demand signals and a signal representative of the lateral rotor disc attitude for modifying said lateral actuator demand signal.

The rotor disc attitude signal may be treated with a predetermined gain and may be summed in a summing junction with a flight control system output signal to provide said modified actuator demand signal. The rotor disc attitude signal may also be treated with a rotor disc attitude rate of change signal.

In another aspect the invention provides a method for improving the control characteristics of a helicopter having a flight control system for providing an actuator demand signal for control of a helicopter main sustaining rotor having a plurality of rotor blades, the improvement comprising generating signals representative of rotor disc attitude and feeding said signals into the flight control system to modify the actuator demand signal.

Preferably the rotor disc attitude signals are derived from flap movements of the main sustaining rotor blades and, in one embodiment, each rotor blade may donate a proportion of one rotor revolution of flap information to create a signal representative of a complete rotor revolution of flap information.

The generated signals may be processed to provide the 1R components before being fed into the flight control system, and in said flight control system, the signals may be treated with a predetermined gain and summed with a flight control system output signal to provide said modified actuator demand signal.

Figure 2:
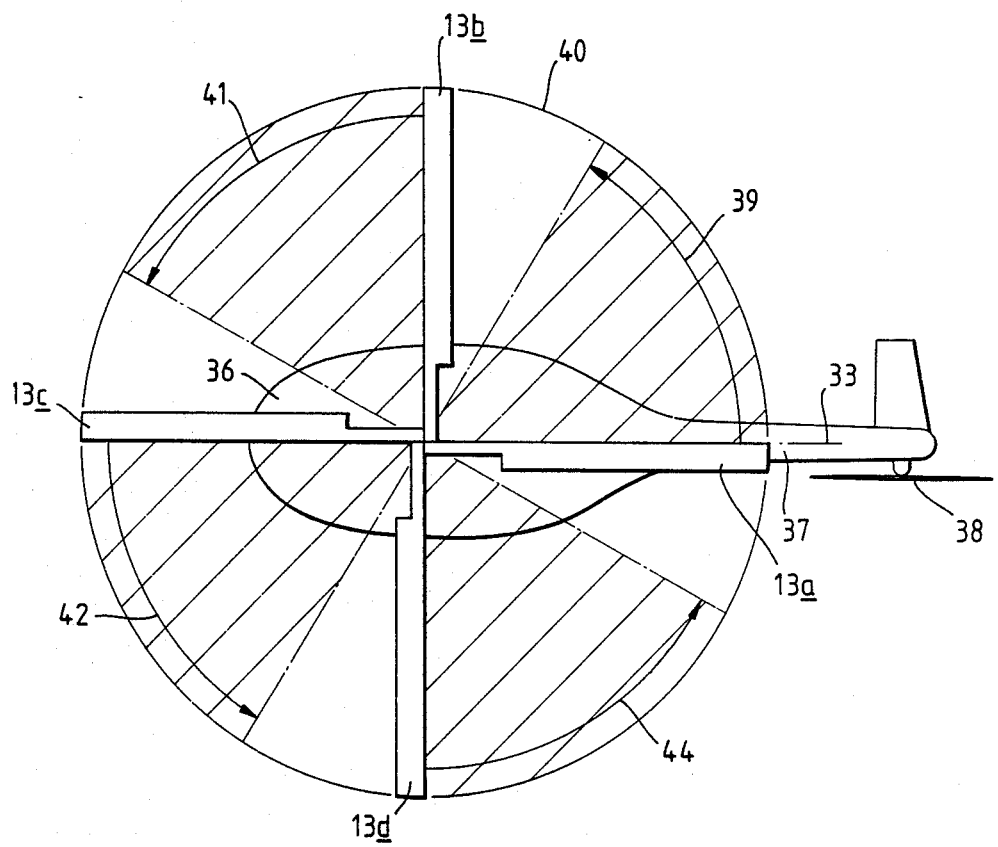
Figure 2:
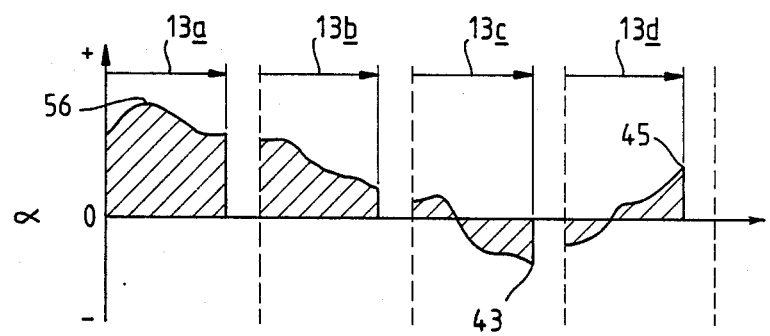
Figure 3:
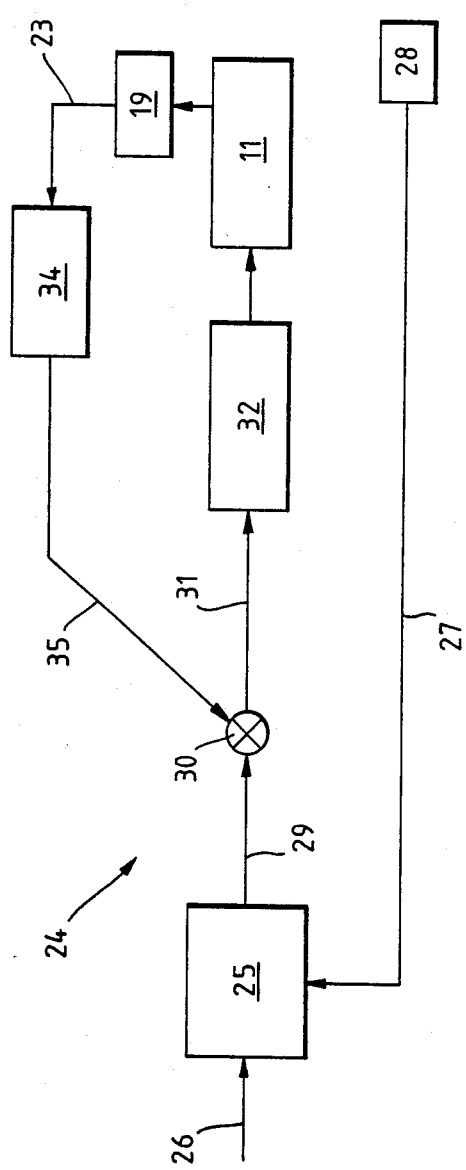
Figure 4:
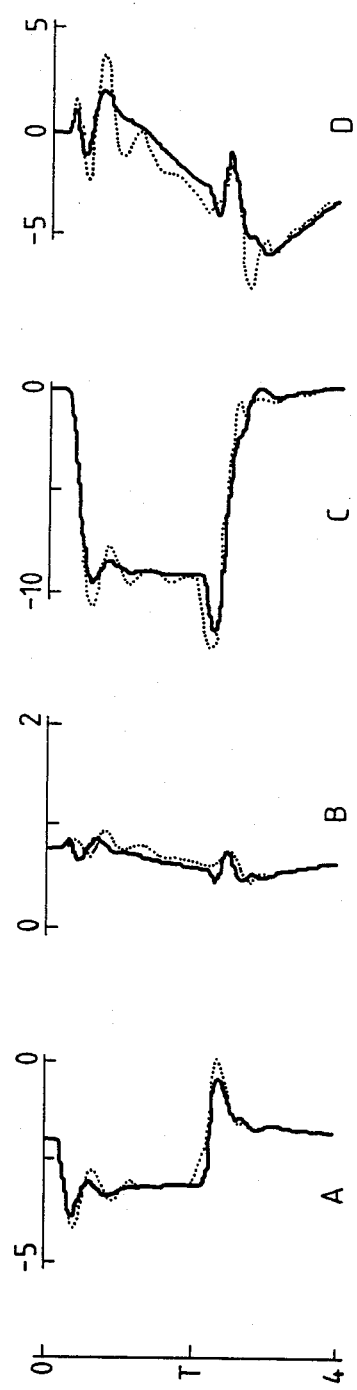
Figure 5:
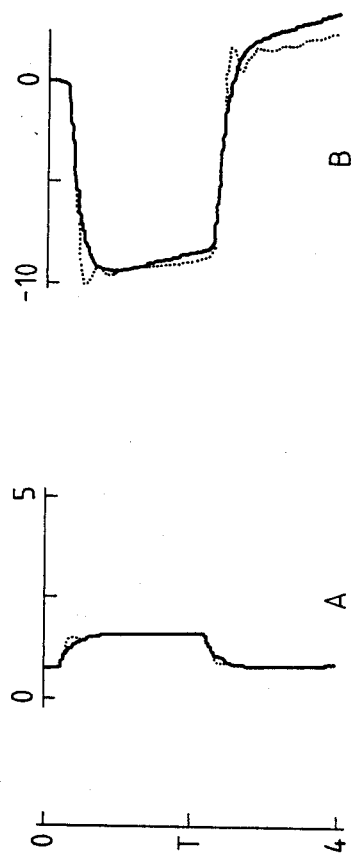

The invention will now be described by way of example only and with reference to the accompanying drawings in which, FIG. 1 is a combined perspective of helicopter rotor and a simplified block diagram showing one means of generating an electrical signal representative of rotor disc attitude, FIG. 2 is a schematic illustrating features of the disc attitude measurement system of FIG. 1, FIG. 3 is a simplified block diagram of a helicopter flight control system according to the invention, and FIGS. 4 and 5 are time histories comparing the response characteristics of a helicopter fitted with a conventional control system with a control system constructed in accordance with this invention.

In considering improvements in the control characteristics of a helicopter it was decided to investigate the effects of including a feedback of rotor state information into the flight control system, and the rotor states considered were the longitudinal and lateral disc attitude and the attitude rate. Longitudinal and lateral disc attitudes correspond to the first harmonic sine and cosine coefficients of blade flap around the rotor disc so that disc attitude information may be derived from information about blade flap angles, and one form of signal generating means for obtaining blade flap angle information will now be described with reference to FIG. 1.

A helicopter main sustaining rotor 11 of a type known as a semi-rigid rotor is located above a fuselage 36 and includes four radially extending flexible elements 12 each supporting a rotor blade 13 for rotation about a generally vertical axis 14. As shown in FIG. 2, fuselage 36 includes a rearwardly extending tail cone 37 carrying an anti-torque rotor 38.

Each rotor blade 13 includes a generally inwardly extending pitch control horn 46 which is connected at its inner end to the upper end of a generally vertical pitch control rod 47. Each of the control rods 47 is connected to an outer end of a radially extending arm 48 of a pitch control spider 4 located within the rotor hub 11. The spider extends downwardly through the rotor hub for connection at its lower end to a blade pitch actuation system 32 comprising a collective pitch control actuator 50, and longitudinal and lateral cyclic pitch control actuators 51 and 52 respectively. The actuators are operated by actuator demand signals 31 generated by a flight control system 24 (see also FIG. 3).

In a semi-rigid rotor, blade flap movements are permitted by bending of the flap elements 12 about virtual hinge axes 15. Strain gauges 16 mounted on each flap element 12 in the vicinity of the virtual hinge axis 15 and connected electrically through a rotating electronics ring 17 having an azimuth marking and a fixed electronics ring 18 and azimuth detector can therefore provide on the helicopter fuselage four analogue signals proportional to the flap positions of the four rotor blades 13.

The signals are passed to a data processing module 19 which provides the 1R components of blade flap. The processing in module 19 is achieved digitally and in order to reduce lags in data updates, a discrete fourier transform (DFT) technique is used in signal processor 20 to determine the 1R components of the blade flap profile. The use of such a sampled data technique means that careful attention must be paid to preventing corruption due to signal aliasing and the signal processor 20 is therefore preceded by an anti-aliasing filter 21.

For the particular rotor under consideration, 1R corresponds approximately to 5 Hz so that anti-aliasing filter 21 is of 2nd order with a cut off frequency of 50 Hz and is of analogue form. The resulting four signals 54 proportional to the lower flap harmonics from each blade are converted to digital form signals in converter 22. Since the four signals 55 contain only components up to 10R, a sampling rate for the signal processor 20 of 24R (i.e. every 15 degrees of rotor azimuth) is adequate.

Preferably the sampling rate is triggered by a shaft encoder to provide independence from rotor speed variations.

Since four signals are available the signal processor 20 can update rotor disc attitude information at a rate of 4R and, as shown in FIG. 2, each rotor blade 13 donates one quarter rotor revolution of flap information. Thus, starting from a rear zero degree datum position 33 and assuming that a left lateral cyclic input is effective on the sustaining rotor 11, rotor blade 13a contributes flap information as it moves through segment 39 of upper right quadrant of rotor disc 40 and, as shown in the lower part of FIG. 2, the flap angle $\alpha$ increases from an initial positive value to a peak value indicated at 56 then reduces. Blade 13b contributes flap information as it moves through segment 41 of the upper left quadrant of rotor disc 40, during which the flap angle of the blade continues to reduce. The flap angle $\alpha$ of blade 13c reduces as it moves through segment 42 of the lower left quadrant of rotor disc 40 from an initial positive value to a negative (downward flap) value indicated at 43. Rotor blade 13d contributes flap information as it moves through segment 44 of the lower right quadrant of rotor disc 40, during which movement the flap angle $\alpha$ reverts from the negative value 43 to a positive (upward flap) value indicated at 45. In this manner one complete rotor revolution of flap information is created from which the signal processor 20 (FIG. 1) derives the 1R components which comprise the longitudinal and lateral disc attitude signals that are transmitted at 23 to the helicopter flight control system 24 (FIGS. 1 and 3).

Referring now to FIG. 3, helicopter flight control system 24 includes a flight control module 25 in which pilot input signals 26 are processed with signals 27 derived from various fuselage rate sensors such as pitch rate sensor 28 to provide output signal 29. Signal 29 is treated in summing junction 30, as hereinafter described, to provide the actuator demand signal 31 which controls the actuation system 32 to adjust as necessary the pitch of the rotor blades of main sustaining rotor 11 (see also FIG. 1).

Signal 23 obtained from the data processing module 19 as hereinbefore described is treated with a predetermined gain 34, and the resultant signal 35 is fed to summing junction 30 in which it is summed with the flight control module output signal 29 to modify actuator demand signal 31 by superimposing a control function based on rotor disc attitude information.

It will be understood that the above described control system is utilised in both the longitudinal and lateral flight control axes and in a preferred embodiment of the invention a rotor disc attitude feedback loop representative of lateral rotor disc attitude is fed into the lateral axis controller and a feedback loop representative of the longitudinal rotor disc attitude is fed into the longitudinal axis controller.

FIGS. 4 and 5 show in full line the various responses to longitudinal and lateral control inputs respectively of the described helicopter with rotor disc attitude feedback according to this invention and also, for comparison, in broken line the same responses for the identical helicopter but without the benefit of rotor disc attitude feedback. Time 'T' in seconds is plotted vertically against various parameters identified in the following description.

A pilot input to the longitudinal axis (FIG. 4) induces a response in both the longitudinal and lateral cyclic blade pitch as shown in degrees at A and B respectively in FIG. 4. It will be noted that these responses are less oscillatory with rotor disc attitude feedback included which has the benefits of reducing actuator activity in the control system and leads to a reduction in the oscillatory pitch rate response as indicated in degrees per second at C in FIG. 4. Furthermore as shown at D in FIG. 4, again in degrees per second, the roll rate reaction to a longitudinal input is reduced by the incorporation of rotor disc attitude feedback indicating a useful reduction in cross coupling.

The benefits of including rotor disc attitude feedback are less evident in respect of a pilot input to the lateral axis as shown in FIG. 5; however it is to be noted that there is some smoothing of the lateral cyclic blade pitch indicated in degrees at A and in the roll rate response indicated in degrees per second at B.

As previously noted, for the type of control system incorporated in the helicopter described in this specification the major benefits from incorporation of rotor disc attitude feedback are achieved in the responses to a pilot input in the longitudinal axis; however, it is to be understood that the benefits from the use of this invention are related to the particular type of control system in which it is incorporated and will vary accordingly.

It will be apparent from the time histories of FIGS. 4 and 5 that suitable rotor disc attitude feedback gains can be chosen for the particular type of helicopter and flight control system under consideration to improve the helicopter response to pilot demands for pitch and/or roll rate, and that the inclusion of rotor disc attitude feedback reduces the cross coupling between the pitch and roll axes.

Whilst one embodiment of the invention has been described and illustrated it will be understood that many modifications may be made without departing from the scope of the invention as defined in the appended claims. For example the invention is not limited to use with the described semi-rigid type rotor and can equally be employed in teetering and articulated type rotors, and it will be understood that when used on such other types modifications may be necessary to the method and apparatus for generating the signals in respect of rotor disc attitude for use in the invention. Similarly, modifications may be made in the treatment of the generated signals for example by incorporation of a rotor disc attitude rate of change signal. Furthermore, whilst described as an improvement to a conventional helicopter flight control system the incorporation of rotor disc attitude feedback according to the invention is also of particular benefit when incorporated in high-gain full authority active control systems since the range of usable values of control system gains is increased allowing active control to be implemented to greater effect.

What is claimed is:

1. A helicopter having a fuselage, a main sustaining rotor with a plurality of rotor blades, an actuation system including a plurality of actuators for controlling the pitch of the rotor blades and a flight control system including pilot controls for providing 1R actuator demand signals, signal generating means for generating signals proportional to the flap positions of each of the rotor blades, and processing means for deriving the 1R components of the signals to provide output signals representative of a rotor disc attitude which are fed into the flight control system for modifying the 1R actuator demand signals.

2. A helicopter as claimed in claim 1, wherein said processing means includes an anti-aliasing filter, a converter for converting said signals to digital form and a signal processor for providing said 1R components.

3. A helicopter as claimed in claim 1, wherein each rotor blade donates a proportion of one rotor revolution of flap information to create a complete rotor revolution of blade flap information.

4. A helicopter as claimed in claim 1, wherein said flight control system provides an actuator demand signal for control in the longitudinal axis and an actuator demand signal for control in the lateral axis, said signal generating means including means for generating a signal representative of longitudinal rotor disc attitude for modifying said longitudinal actuator demand signal and a signal representative of lateral rotor disc attitude for modifying said lateral actuator demand signal.

5. A helicopter as claimed in claim 1, wherein said rotor disc attitude signal is treated with a predetermined gain and summed in a summing junction with a flight control system output signal to provide said modified actuator demand signal.

6. A helicopter as claimed in claim 1, wherein said rotor disc attitude signal is treated with a rotor disc attitude rate of change signal.

7. A method for improving the control characteristics of a helicopter having a flight control system including pilot control inputs for providing actuator demand signals for control of a helicopter main sustaining rotor having a plurality of blades comprising generating signals representative of the flap movements of the main sustaining rotor blades, deriving the 1R components of said signals, generating output signals representative of a rotor disc attitude, and feeding the output signals into the flight control system to modify the actuator demand signals.

8. The method of claim 7, wherein each rotor blade donates a proportion of one rotor revolution of flap information to create a signal representative of a complete rotor revolution of flap information.

9. The method of claim 7, wherein in said flight control system said signal is treated with a predetermined gain and summed with a flight control system output signal to provide said modified actuator demand signal.

* * * * *